Jan. 21, 1958  J. TRABEN  2,820,492
FRAME SAW WITH ADJUSTABLE BLADES
Filed May 9, 1955  4 Sheets-Sheet 1

Jan. 21, 1958　　　　　J. TRABEN　　　　2,820,492
FRAME SAW WITH ADJUSTABLE BLADES
Filed May 9, 1955　　　　　　　　　　4 Sheets-Sheet 2

Jan. 21, 1958  J. TRABEN  2,820,492
FRAME SAW WITH ADJUSTABLE BLADES
Filed May 9, 1955  4 Sheets-Sheet 3

United States Patent Office 2,820,492
Patented Jan. 21, 1958

2,820,492

FRAME SAW WITH ADJUSTABLE BLADES

Josef Traben, Oberkirch, Germany

Application May 9, 1955, Serial No. 507,066

2 Claims. (Cl. 143—156)

This invention relates to a frame saw for producing sawn timber of various thicknesses.

In known frame saws which have to be used to produce wood not only of board thickness but also of greater thickness, such as building timber, it is necessary to reset the saw blades according to the desired thickness of wood as a result of which the saw is out of action for a considerable time.

It has now been found that frame saws can be used in a simple manner for the production of sawn timber, particularly boards and building timber of all the usual thicknesses, and according to the invention a frame saw comprises a continuous saw frame in which the saw blades are adjustable and which has an upper and a lower transverse member, two slides to carry a saw blade therebetween, one on the upper and one on the lower transverse member, threaded spindles for adjusting the slides, angle drives which engage with the threaded spindles, a key shaft which is mounted in a vertical arm of the saw frame and in which it is slidable up and down, a grooved first bevel drive located on said arm in which the key shaft slides, a second bevel drive which is in mesh with the first bevel drive and is connected to a driving shaft and hydraulic means for driving the driving shaft whereby the driving shaft can be adjusted accurately and without play.

As a result of the invention, it is possible to vary the distance between the saw blades, in a particularly simple manner, while the machine and the saw frame are running, for example in the interval between two working operations.

Two slides with the retaining means for the saw blades may, to advantage, be mounted on the upper and on the lower transverse member of the saw frame, in such a manner that for each upper slide there is a corresponding lower slide, between which the saw blades are stretched, the slides and the saw blades being movable jointly across the working bed of the saw frame. The slides may be subject to the action of springs so as to compensate for any play in the drive.

The key shaft may be either a square shaft or a round shaft with longitudinal splines.

Instead of the key shaft being slidable in the bevel drive which embraces it, the key shaft may be rigidly mounted for rotation on the main frame of the machine while the bevel drive which slides along it is connected to the saw frame.

The adjusting devices according to the invention, with their hydraulic actuation, have the further advantage that the saw blades are always adjusted steplessly, accurately and reliably. The screw drives used also cause a self-locking effect so that the saw blades cannot inadvertently move from their set position.

Each threaded spindle may, if necessary, be provided with more than two screw threads, so as to be able to drive correspondingly more slides for one or more saw blades. The screw threads may each have the same pitch so that the slides and with them the suspended saw blades, may, for example if they are moved only by right-handed screw threads, be moved at equal distances from one another. It is also possible, however, to provide a plurality of screw threads having different pitches so that the slides moved by the screw drives are moved different distances when the threaded spindle is turned. For example, the screw drives and their pitches may be such that, for one revolution of the spindle, the outermost slides nearest to the uprights of the saw frame, move through a greater distance than the slides further from the uprights. In this case, the arrangement and pitches of the screw drives may be such that, for one revolution of the threaded spindle, the slides and with them the suspended saw blades, starting from a very narrow central position in the saw frame, may be moved towards the two saw frame uprights, through distances which increase from the centre of the frame towards the uprights, so that, if the area of the frame is fully equipped with saw blades, the distances between them, individually or in groups, increase progressively from the central position towards the uprights.

It is also possible to provide screw drives having a plurality of screw threads of different pitch so that the slides mounted on these various threads and moved by them will be moved correspondingly different distances when the threaded spindle is turned.

It is further possible, on the one saw frame, to mount the threaded spindles and the slides for the saw blades running thereon, side by side and parallel to the transverse members in such a manner that the saw blades, which are suspended from the slides of one spindle, can be moved like a curtain past the saw blades which are suspended from the slides on the other spindle. With such a curtain-like arrangement it is possible to saw extremely thin boards, for example for the manufacture of plywood, from a log, all that is necessary in this case being to move one or more saw blades from the one system or the one "curtain" and one or more saw blades from the other system or the other "curtain" out of or towards the common line of the saw blades in the direction of feed of the log, by an amount corresponding to the desired thickness of the board.

For this curtain-like arrangement and movement of saw blades or groups of saw blades it may be advantageous to provide means, such as toothed wheels or the like, to hold the boards produced by the saws of the one "curtain," when these boards are attacked by the saws in the second "curtain."

An indicator device may be provided by means of which the distances between the relatively adjustable saw blades or groups of saw blades are constantly indicated so that the setting of the distances between the saw blades can be regulated accordingly. For example, the drive for the indicator device may be derived from the hydraulically operated driving shaft which in turn rotates the key shaft on the saw frame.

Preferably the frame saw is equipped with means to compensate for binding or tilting or variations in length of the saw blades, for example as a result of heating during the sawing process. Such binding or tilting of the saw blades may arise, for example if the spacing between the slides holding a saw blade or a group of saw blades varies during the setting of said slides, for example as a result of the threaded spindle moving the slides and the transverse member carrying them being out of parallel or as a result of inaccuracies in the screw drive moving the slides.

The saw blades are preferably adjustably suspended in their holders in such a manner that they can expand or contract longitudinally, while on the other hand being located in the transverse direction so that they cannot twist or shift sideways. For this purpose the mounting and retaining of the saw blades is so constructed that the blades are held at the top and bottom as in a grating.

The adjusting mechanism may be further improved by providing closed bearings for end journals of the spindles on the transverse members of the saw frame to simplify mounting and dismounting of the adjusting spindles for the slides, said closed bearings being displaceable by means of special screw drives, while the other end of the spindle is coupled by means of a differential thread to the driving member carrying the slide and turning the spindle, and actuated by the hydraulic means.

An embodiment of a frame saw according to the invention is hereinafter described, by way of example, with reference to the accompanying drawings, in which.

Figure 1:
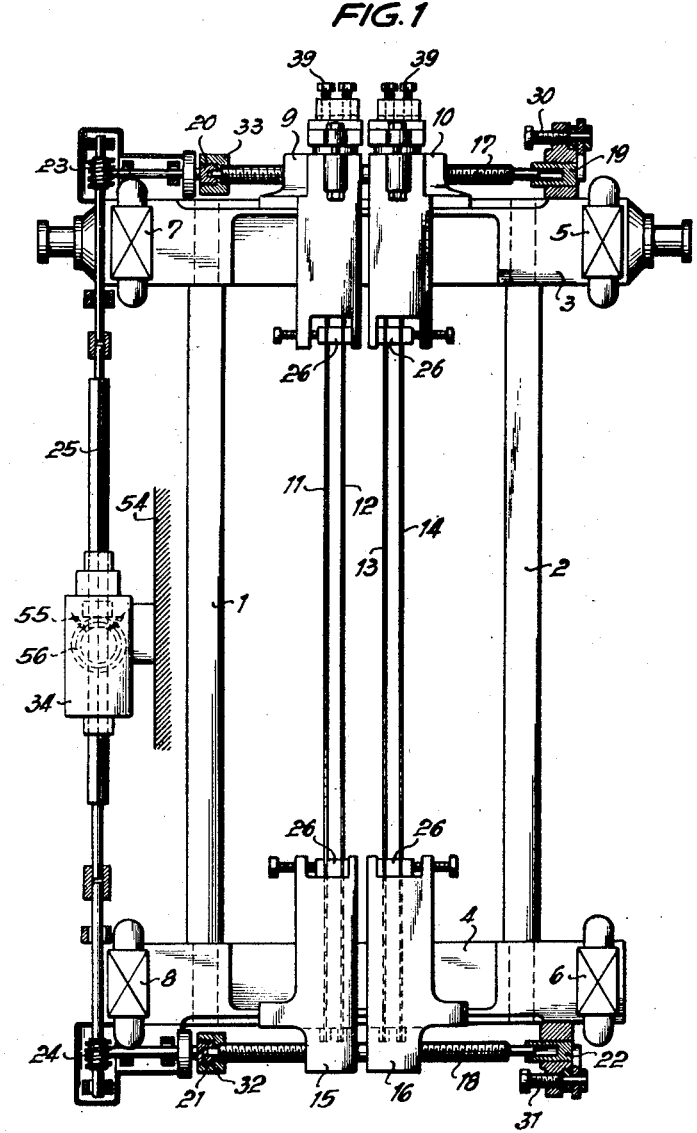
Figure 1 is a front view of the saw frame in the direction of the saw bed.

The saw frame consisting of two side portions 1, 2 and upper and lower transverse members 3, 4, slides by means of guide members 5, 6, 7, 8 in guideways in the main frame of the saw which are not illustrated. On the upper transverse member 3 of the saw frame, slides 9 and 10 are adjustably mounted. Threaded spindles 17 and 18 with left-hand and right-hand threads displace the slides 9 and 15 in the opposite direction to the slides 10 and 16.

Figure 1A:
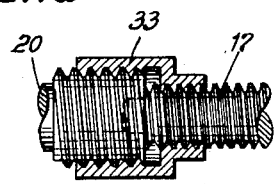
Figure 1a is a detail section.

The end journals of the spindles 17, 18 engage in closed bearings 19, 20, 21, 22 on the transverse frame members 3 and 4. The bearings 19, 22 are displaceable by means of screws 30, 31. The bearings 20, 21 are each provided with a coupling nut 33, 32 having two internal threads of different pitch, as shown in Figure 1a, one of which is screwed onto the spindle 17, 18 and the other on an external thread on the shaft of the closed bearing 20, 21. If the external thread on the shaft of the bearing 20, 21 is provided with a coarser pitch than that of the spindle thread, the nut 33, 32 forces the spindle 17, 18 out of the closed bearing when the bearing thread is unscrewed, but still remains screwed onto the spindle thread and thus does not get lost. This arrangement makes it possible to mount and dismount the threaded spindle and slides quickly and easily so that the frame saw can, if necessary, also work with a normal frame, and in particular it makes it possible to adjust the spindles and slides in a simple manner.

The screw drives 17, 18 are coupled together via the worm drives 23, 24 and via the square shaft 25 joining these drives. When this shaft is turned, the slides 9 and 10 and the slides 15 and 16 are moved either closer together or further apart, the suspended saw blades 11, 12 and 13, 14 being carried along with the slides.

The distance between the blades 11 and 12 is ensured by means of intermediate members 26 and that of the blades 13 and 14 by means of similar intermediate members 26; the thickness of the intermediate members, which are preferably interchangeable, depends on the dimensions of the boards or the like to be produced. Each slide may be adapted to receive more than two saw blades.

Figure 2:
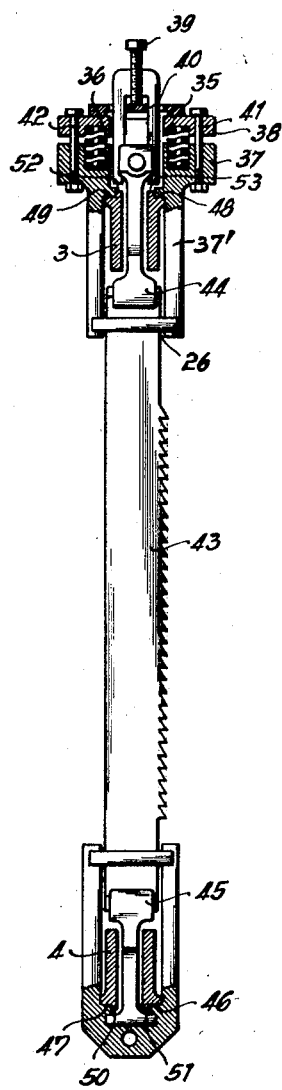
Figure 2 is a cross section through the frame.

In order to prevent the saw blades from being subjected to excessive mechanical stresses as a result of the upper and lower slide guiding being out of parallel, or from bending or twisting laterally for example as a result of heat expansion, each saw blade is mounted taut in the manner shown in Figure 2, and with substantially constant pre-stressing. The saw blade numbered 43 in this figure is suspended at the top in tongue means 44 which runs inside the longitudinally split transverse member 3 and rests against a plate 38 via a link 40 which is displaceable in the tongue means and which is adjustable in relation to the tongue means by means of a screw 39 for tightening the saw blade. The plate 38 is held and guided by bolts 41, 42 which engage through the head 37 of the slide and here each carries a thread on which is mounted a nut by means of which the tension of springs 35, 36 can be varied. These springs rest in the head 37 of the slide and in the plate 38 and tend to force the latter away from the head 37, the nuts and the heads of the bolts forming stops. The cheeks 37' of the slide 37 enclosing the transverse frame member are extended at the bottom so as to engage some distance over the saw blade 43 below the tongue means 44, and here they are connected to intermediate members 26 which run between saw blades of the one slide close to the wide faces of the blades. The saw blades are supported on all sides by the slots formed by the cross strips and the cheeks, without interfering with the resilient longitudinal mobility of the blades.

At the bottom, the saw blade 43 is mounted in the tongue means 45 supported by the lower transverse member 4. The guides 46, 47, 48 and 49 for the slides are mounted deeper than the bearing surfaces 50, 51, 52 and 53 provided as supports for the saw blades during normal running of the saw. As a result, the particularly carefully machined slide guides are not damaged during pre-stressing of the saw blades inserted for normal running. The arrangement of the pressure springs 35 and 36 inside the slide of the upper transverse member has the advantage that the springs are not stressed during the operation of the saw blades, because the saw only cuts on the down stroke.

Figure 3:
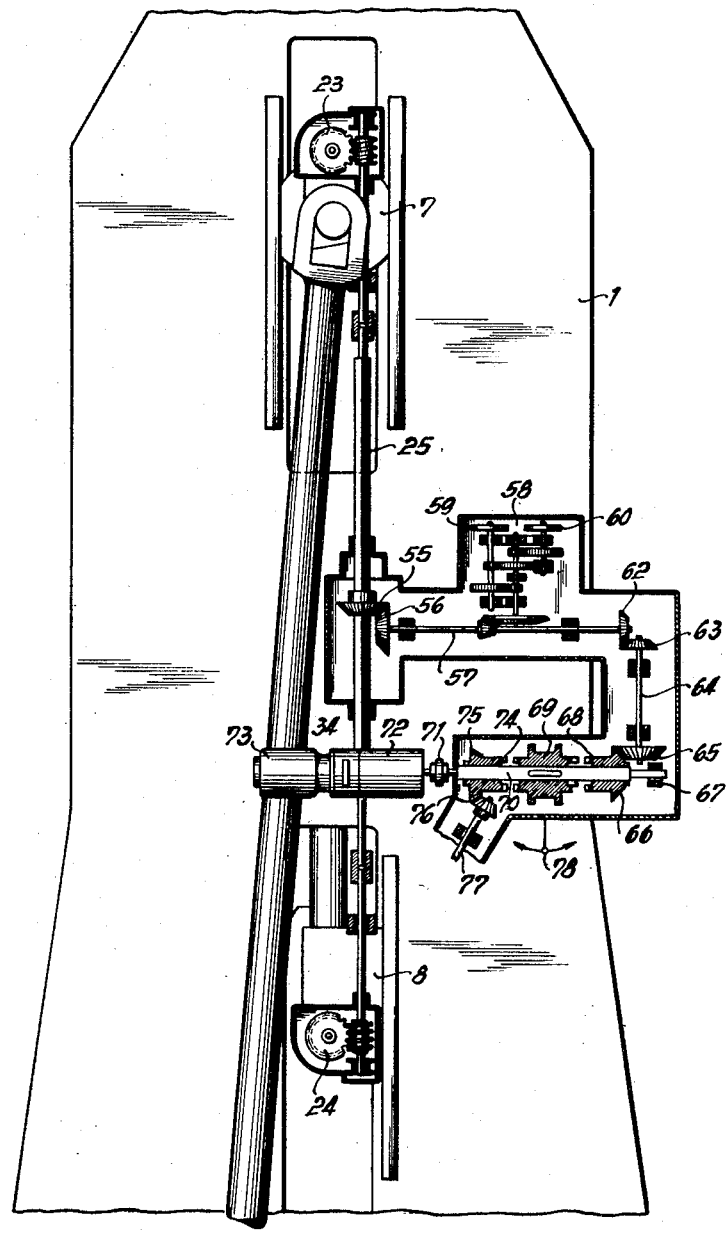
Figure 3 is a side elevation of the frame saw.

The square shaft 25 slides in a bevel gearwheel 55 which is mounted in a housing 34 provided on the main frame 54 of the saw and engages with another bevel gearwheel 56. As shown in Figure 3, the bevel gearwheel 56 is turned by its shaft 57 which is connected to hydraulic actuating means which permit stepless regulation during fine adjustment and automatically switch off the source of power in the event of overloading, for example as a result of locking of the slides during setting. The indicator device 58 is connected to the shaft 57. Its gearing is such that the indicators on the two scales 59 and 60 correspond to the distance between the two saw blades 12 and 13 (Figure 1) and hence to the dimensions of the middle board which is to be sawn. The scale 59 is for fine measurement and the scale 60 for rough measurement, for example in such a manner that one rotation of the fine scale indicates the unit of measurement corresponding to one division on the rough scale. This permits the distances between the saw blades to be read off accurately and easily. Counters could be used instead of the indicator device illustrated.

The shaft 57 is driven via a pair of bevel gearwheels 62, 63, a shaft 64 and another pair of bevel gearwheels 65, 66 driven by a shaft 67 on which is rigidly mounted a clutch portion 68 which can be engaged with or disengaged from the movable clutch portion 69. The clutch portion 69 is connected via a shaft 70 and a normal coupling 71 to hydraulic transmission gear 72 which is driven from an electric motor 73. Mounted rotatably on the shaft 70 is a sleeve which carries the other clutch portion 74 and a bevel gearwheel 75. The bevel gearwheel 75 engages in the bevel gearwheel 76 which is mounted on a shaft 77 by means of which the feed rollers of the frame saw are driven.

By switching over the centre clutch portion 69 in the direction of the arrow 78 these feed rollers are set in rotation. By switching the clutch portion 69 over to the other clutch portion 68, the shaft 57 is set in rotation, via the shaft 67 and the shaft 64, and turns the key shaft 25 via the bevel gearwheels 56, 55. The position of parts 62—78 is shown in Figure 3 at 90° from the horizontal in the plane of the drawing.

Figure 5:
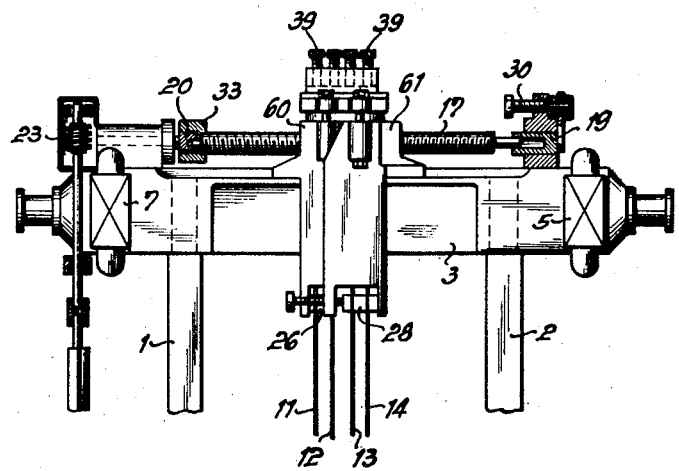
Figure 5 shows the same arrangement in elevation.
Figure 4:
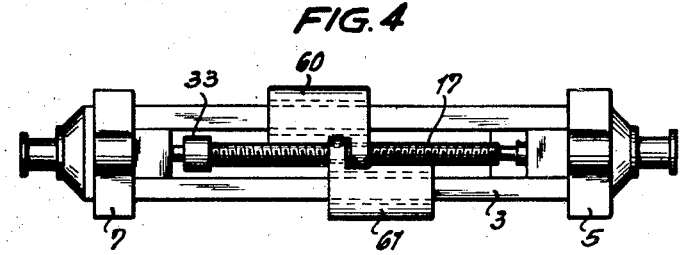
Figure 4 shows from above a curtain-like arrangement of the saw blades one behind the other.

With the curtain-like arrangement of saw blades one behind the other as shown in Figures 4 and 5, the slides carrying the saw blades are numbered 60 and 61; they can be displaced on the transverse member of the saw frame by means of the threaded spindle 17 in such a manner that they move in relation to one another like a pair of curtains.

I claim:

1. A high speed frame saw for the cutting of sawed timber of varying thickness having saw blades adjustable while the saw is in operation, comprising an upper and a lower transverse member, at least two sliders on each transverse member for the suspension of the saw blades on the upper and the lower transverse members, opposite hand threaded spindles engaging and for the adjustment of the slides with worm gears fixed to the said spindles, a keyed shaft mounted on a vertical side member of said frame and slidable in a grooved bevel gear and bearing worms respectively engageable with said worm gears, a second bevel gear in engagement with said first bevel gear and connected to a drive shaft, said drive shaft being adjustable by hydraulic means, each said saw blade hanging at its upper end in a tongue means displaceable along the transverse member, said bearing resting against a plate via a link, which is displaceable in the tongue means and adjustable relative to the tongue means by means of a screw, said plate being held on a head of said slide by bolts and guided displaceably thereon, springs being provided between said head of slide and said plate to push said head and said plate asunder, cheeks of said slide enclosing said transverse member being extended downwardly so as to engage the upper ends of the saw blades and being connected by cross strips, said cross strips running tightly at both wide faces of the saw blade end, said transverse members resting on very carefully machined guides only at the idle upward stroke, while at the downward stroke, when said springs are pressed together, said transverse members get loose from said guides, the formed pressure forces being taken up by special supports.

2. A high speed frame saw in claim 1, wherein bearings are provided at said transverse members in which engage the end journals of the screws having spindles and displacing said slides, one respective bearing of one of the spindles of a screw being displaceable and the other fixed, a nut having two internal threads of different pitch being provided at the other respective bearing, of which threads one is screwed onto said spindle, and the other onto an external thread of the shaft of the fixed bearing.

References Cited in the file of this patent

UNITED STATES PATENTS

| 14,485 | Wagner | Mar. 18, 1856 |
| 107,886 | Dorr | Oct. 4, 1870 |
| 408,807 | Mann | Aug. 13, 1889 |
| 557,391 | Inglish | Mar. 31, 1896 |

FOREIGN PATENTS

| 290,378 | Germany | Feb. 22, 1916 |
| 454,133 | Germany | Dec. 30, 1927 |
| 519,846 | Germany | Mar. 5, 1931 |